United States Patent [19]

Ries

[11] 4,395,584

[45] Jul. 26, 1983

[54] CABLE SHAPED CRYOGENICALLY COOLED STABILIZED SUPERCONDUCTOR

[75] Inventor: Günter Ries, Weingarten, Fed. Rep. of Germany

[73] Assignee: Siemens Aktiengesellschaft, Munich, Fed. Rep. of Germany

[21] Appl. No.: 274,441

[22] Filed: Jun. 17, 1981

[30] Foreign Application Priority Data

Jun. 25, 1980 [DE] Fed. Rep. of Germany ....... 3023856

[51] Int. Cl.³ .......................... H01B 12/00; H01F 7/22
[52] U.S. Cl. ................................ 174/15 S; 174/128 S; 335/216
[58] Field of Search ............... 174/15 S, 126 S, 128 S; 29/599; 335/216

[56] References Cited

U.S. PATENT DOCUMENTS

| | | | |
|---|---|---|---|
| 3,504,314 | 3/1970 | Anderson | 174/128 S |
| 3,900,702 | 8/1975 | Albrecht | 174/126 S |
| 3,913,044 | 10/1975 | Albrecht | 174/15 S X |
| 4,195,199 | 3/1980 | Hillmann | 29/599 X |

FOREIGN PATENT DOCUMENTS

| | | | |
|---|---|---|---|
| 0004009 | 9/1979 | European Pat. Off. | 174/15 S |
| 2256594 | 5/1974 | Fed. Rep. of Germany | 174/128 S |
| 2626384 | 12/1977 | Fed. Rep. of Germany | 174/128 S |
| 2626914 | 12/1977 | Fed. Rep. of Germany | 174/128 S |
| 2736157 | 2/1979 | Fed. Rep. of Germany | 174/128 S |

Primary Examiner—A. T. Grimley
Assistant Examiner—Morris H. Nimmo
Attorney, Agent, or Firm—Kenyon & Kenyon

[57] ABSTRACT

A cable shaped cryogenically stabilized heavy current superconductor contains several superconducting elements embedded in a matrix material and several stabilizing elements arranged parallel thereto, the electric conductivity of which, in the normally conducting state of the conductor, is substantially higher than that of the matrix material. These elements are fastened on a support body of low electric and thermal conductivity. The stabilizing elements are arranged on the support body physically separated at predetermined spacings from the respective adjacent superconducting elements and the spaces thus formed between the adjacent superconducting elements and the stabilizing elements is filled, at least largely, with a cryogenic coolant. Due to the small coupling between the superconducting elements and their associated stabilizing elements, good cooling of the conductor and relatively low-loss operation can be ensured even in applications with alternating fields.

8 Claims, 2 Drawing Figures

CABLE SHAPED CRYOGENICALLY COOLED STABILIZED SUPERCONDUCTOR

BACKGROUND OF THE INVENTION

This invention relates to superconductor structures in general and more particularly to a cable shaped cryogenically stabilized heavy current superconductor structure.

A cable shaped cryogenically stabilized heavy current superconductor structure which contains superconducting elements comprising strands of superconductive material which are embedded in a matrix material of predetermined electric conductivity, with several stabilizing elements of thermally and electrically highly conductive material extending parallel thereto is described in U.S. Pat. No. 4,195,199. The stabilizing elements are normally electrically normally conducting at the operating temperature of the superconductor structure, and have an electric conductivity which is substantially higher in the normally conducting state of the heavy current superconductor structure than that of the matrix material of the superconducting elements. Also included is a support body of a material of relatively low thermal and electric conductivity, on which the stabilizing elements and the superconducting elements are fastened.

The superconductive material of the superconductive strands of the corresponding elements of this known current superconductor structure may be, in particular, an intermetallic compound of the type $A_3B$ with an A-15 crystal structure as for instance $Nb_3Sn$ or $V_3Ga$. The elements therefore each contain a multiplicity of filaments of such an intermetallic compound embedded in a bronze matrix. Such heavy current superconductor structures have good superconducting properties, are distinguished by high critical values and are therefore suitable particularly for magnet windings to generate strong magnetic fields. Besides the mentioned superconducting binary compounds, ternary compounds such as niobium-aluminum-germanium $Nb_3Al_{0.8}Ge_{0.2}$ may also be provided as conductive materials.

To ensure undisturbed continuous operation of a device equipped with superconductor structure such as a magnet coil or a cable, so-called cryogenic stabilization may be provided. According to this well-known type of stabilization, the superconductive material of the conductor is joined to electrically and thermally highly conductive material such as copper or aluminum. By thoroughly cooling this normally conducting material, a spot in the superconductive material which has become normally conducting can be returned to the superconducting state without interruption of the operation, i.e., the temperature can again fall below the transition temperature of the superconductive material even though the current is maintained.

In the heavy current superconductor structure described in U.S. Pat. No. 4,195,199, the stabilization of the superconducting elements is achieved by also arranging special stabilizing elements of normally conducting material parallel to the superconducting elements. These stabilizing elements and the superconducting elements are twisted around a ribbon-shaped carrier body which may consist, for instance, of a material of high mechanical strength such as alloy steel. The elements are fastened on this ribbon. Adjacent superconducting and stabilizing elements of this heavy current superconductor structure are in intimate electrical and thermal contact with each other, which is obtained for instance, due to a joint hot deformation for shaping the conductor structure into a flat cable. The known heavy current superconductor structure therefore has a low transversal resistance so that it has correspondingly high losses in time-varying magnetic fields. Also, in this heavy current superconductor structure, the necessary cross sectional area of normally conducting metal is several times larger than the superconductor area required for transporting the current. The average current density of this conductor structure is therefore limited accordingly.

It is therefore an object of the present invention to improve the heavy current superconductor structure of the type mentioned at the outset in such a way that its requirement for normally conducting stabilizing metal is reduced, the requirements as to cooling are diminished and, nevertheless, reliable and low-cost operation is ensured even in applications in alternating fields. In addition, this conductor should be of relatively simple design.

SUMMARY OF THE INVENTION

According to the present invention, this problem is solved by arranging the stabilizing elements on the support body physically separated from the adjacent superconducting elements by a predetermined spacing, and filling the spaces thus formed between the adjacent superconducting elements and stabilizing elements, at least largely, with a cryogenic coolant.

Through the heavy current superconductor structure according to the present invention, a spatial separation of the superconducting elements from the stabilizing elements is therefore provided. Therefore, only a poorly heat conducting connection is provided between these parallel elements. In addition, moderate ohmic coupling exists between these elements, which permits the transition of the current into the parallel stabilizing material if a superconducting element becomes normally conducting. Normally conducting stabilizing elements then have a substantially lower electric series resistance than the superconducting elements when the latter have become normally conducting and then take over the major part of current flowing in the overall heavy current superconductor structure because of the metallic coupling. The Joule heat then produced in the superconducting element is small because of the low conductivity, and the temperature falls rapidly below the transition temperature of the superconductor structure because of the good cooling of two to three sides. The temperature in the normally conducting stabilizing elements, which then adjusts itself is only of little influence on the recovery behavior of the overall conductor, contrary to the known conductor designs. Since, furthermore, the electric transversal resistance of the heavy current conductor structure is large, its alternating field losses are accordingly small. It can therefore be used particularly for poloidal and toroidal field coils in plasma physics equipment such as in fusion reactors.

DETAILED DESCRIPTION

Figure 1:
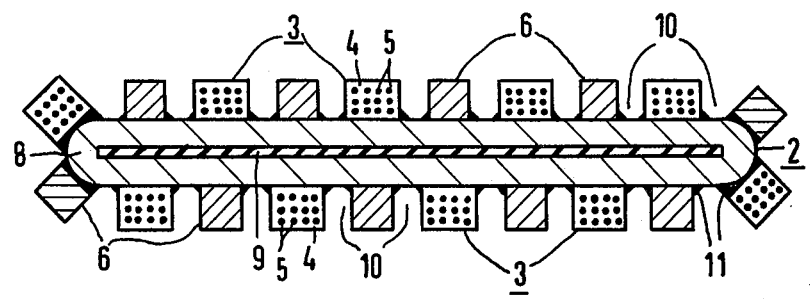
FIG. 1 schematically illustrates part of a cable shaped heavy current superconductor structure according to the present invention.

The heavy current superconductor structure 2 which is shown in the figure in a cross section, contains several, for instance, ten superconducting elements 3 which are arranged parallel to each other. Each of these superconducting elements consists of a matrix 4 in which a multiplicity of superconducting wires 5 are embedded. The superconducting material of these wires can advantageously occupy a relatively large portion of the entire cross section area of the elements 3 as compared to the matrix material. Advantageously, material which has a predetermined electric conductivity which is substantially smaller, particularly at the operating temperature of the conductor structure, than that of copper or aluminum is used as the matrix material. Such superconducting conductor elements can be, for instance, so-called multifilament wires with niobium-titanium filaments which are embedded in a copper-nickel matrix. Also $Nb_3Sn$ filaments in a pure bronze matrix or a bundle of carbon fibers coated with niobium carbonitride can be provided as the superconducting elements 3. The elements each have an approximately rectangular cross section. However, similar elements can also be provided with other, for instance, round cross-sectional shapes.

Between respective adjacent superconducting elements 3, conductor elements 6 of an electrically highly conductive stabilizing material which are electrically normally conducting at the operating temperature of the heavy current superconducting structure such as, for instance, copper are arranged. The electric conductivity of the stabilizing elements which have, for instance, the same cross-sectional shape as the superconducting elements 3, is substantially higher than that of the matrix material of the superconducting elements. Advantageously it is at least one order of magnitude larger. The superconducting elements 3 and the normally conducting stabilizing elements 6 are twisted around a ribbon-shaped support body 8. This carrier body consists advantageously of a nonmagnetic material of high mechanical strength and relatively low electric and thermal conductivity, such as for instance, alloy steel. It advantageously contains an insulating center plane 9.

According to the present invention, the superconducting elements 3 and the normally conducting stabilizing elements 6 are fastened to the outside of the carrier body 8 mutually spaced in such a manner that a predetermined space 10 is formed between respective adjacent elements. For instance, the elements 3 and 6 are soldered to the support body 8 with a high-resistance solder 11 or are also welded thereto. Advantageously, the spaces 10 remaining between respective adjacent elements can be filled completely with a cryogenic coolant, for instance, with liquid helium which keeps the superconducting elements 3 at their predetermined operating temperature.

Figure 2:
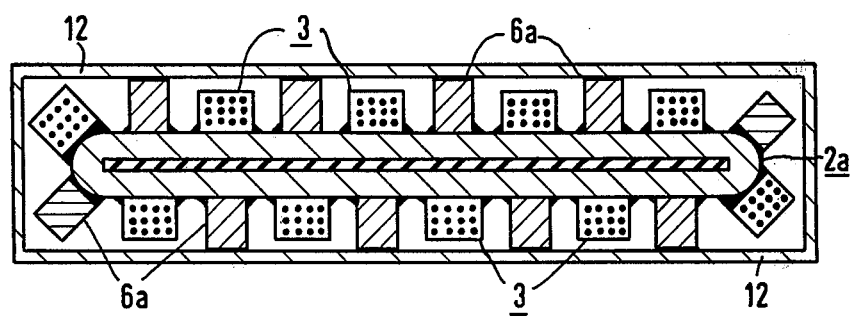
FIG. 2 is a view of a heavy current superconductor structure according to the present invention contained within a coolant-tight jacket of nonmagnetic material.

In addition, as illustrated in FIG. 2, a heavy current superconductor structure 2a, which is designed as a flat cable, can optionally be enclosed by a coolant-tight jacket 12 of a high strength material such as nonmagnetic alloy steel. Thus, a hollow conductor is obtained, through which the cryogenic coolant can be forced. The structure is exactly the same as that of FIG. 1 except that the stabilizing elements 6a have a greater height to space the jacket 12 from the superconducting elements 3. Jackets of correspondingly designed superconducting are known, for instance, from DE-AS 26 26 914 and DE-OS 28 09 573. Besides forced cooling in such hollow conductors, however, bath cooling of the heavy current superconducting 2, shown in FIG. 1, is also possible.

According to the illustrated embodiment of the present invention shown in the figure, it is assumed that the total cross-sectional area of all normally conducting stabilizing elements 6 is only slightly smaller than the total cross-sectional area of all superconducting elements 3. However, it is also possible to provide a substantially smaller area ratio. The channel-like spaces 10 can also be chosen narrower than shown. Thus, a relatively compact conductor design with a large current carrying capacity is obtained.

Due to the physical spacing of the superconducting elements 3 from the normal conducting stabilizing elements 6 adjacent to them, very little thermal coupling and also only moderate electrical coupling of the superconducting wires with the stabilizing material is achieved. Only the support body 8, possible solder layers and an optionally provided conductor jacket can contribute to a slight amount of coupling.

If such heavy current superconductor structures 2 are used in magnet coils, their normally conducting stabilizing elements 6 and their superconducting elements 3 are advantageously designed so that pressure forces occurring in the magnet winding transversely to the conductor axis are taken up solely by the stabilizing elements 6. Damage to the superconducting elements, particularly if these contain brittle inter-metallic compounds, can thus be prevented. In additions, dissipative effects, for instance, due to plastic deformation or movements of the conductors are advantageously limited to the stabilizing elements, where the temperature rise resulting therefrom does not lead the superconductive material to become normally conducting.

The heavy current superconductor structure according to the present invention can advantageously be used for devices with alternating field stresses since the existing poor heat conduction between the superconducting elements and the associated stabilizing elements always means low electric transversal conductivity of the conductor. The alternating field losses caused by the coupling currents are thus accordingly small.

The small dissipation in the superconducting elements of the heavy current superconductor structure according to the present invention results in a number of advantages. Thus, the share of the stabilizing material can be kept relatively small. The average current density of the conductor is then accordingly increased. If forced cooling of the conductor structure is provided, only a relatively small heat transfer coefficient is necessary. Also, therefore, only a correspondingly small mass flow of cryogenic coolant along the conductor structure and therefore a correspondingly small pump is necessary. In addition, the cooled surface area of the normally conducting stabilizing material can be kept small. Only a few normally conducting stabilizing elements or stabilizing elements with a relatively small cross-sectional area are then needed and the conductor structure design thus becomes more compact and simple. Since, furthermore, superconducting elements with a large cross-sectional area of superconductive material in the matrix of poorly conducting hard metal can be provided, a smaller throughput in the manufacturing process of the conductor structure is also required. As superconducting elements, for instance, $Nb_3Sn$ multifilament wires with a pure bronze matrix can be used, where no problems of diffusion of tin into the stabilizing material arise during the necessary annealing treatment to form the superconducting compound Nb$_3$Sn.

An example, helpful in understanding the present invention will now be given. The Joule heat of a known superconductor structure, the normal conducting stabilizing material of which is in direct thermal contact with a superconductive material, is to be compared with the corresponding temperature rise of a heavy current superconductor structure according to the present invention. With a linear heat transfer coefficient h, such as in a forced cooled heavy current superconductor structure according to the present invention designed as a hollow conductor structure, the Joule heat due to an electric current I leads to the following temperature rise $\Delta T_{SL}$ in the superconductor structure:

$$\Delta T_{SL} = \frac{q_{SL}}{h} = \frac{I^2}{h \cdot P_{SL}} \cdot \frac{\sigma_{SL} \cdot A_{SL}}{(\sigma_{NL} \cdot A_{NL} + \sigma_{SL} \cdot A_{SL})^2}$$

where q is the specific power given off into the coolant through the cooled surface, P is the conductor structure surface wetted by the coolant per unit length, $\sigma$ is the specific electric conductivity, and A is the cross-sectional area. The quantities corresponding to the superconducting elements 3 and the normally conducting stabilizing elements 6, respectively, are indicated by the subscripts SL and NL. In a stabilized superconductor structure of conventional design, the normally conducting stabilizing material of which is in direct thermal contact with the superconductive material, on the other hand, the temperature rise is, according to the known relations for cryogenic stabilization (see, for instance, IEEE Trans. Nucl. Sci., 1965, NS-12 pp 367-372):

$$\Delta T_{NL} = \frac{q_{NL}}{h} = \frac{I^2}{h \cdot P_{NL}} \cdot \frac{1}{\sigma_{NL} \cdot A_{NL}}$$

This temperature rise is approximately equal to the temperature rise $\Delta T_{SL}'$ of the associated superconductive material so that we have:

$$\Delta T_{NL} \approx \Delta T_{SL}'$$

For the superconducting material for the heavy current superconductor structure according to the invention, one then obtains a temperature which is lower by the following factor:

$$\frac{\Delta T_{SL}}{\Delta T_{SL}'} \approx \frac{\sigma_{SL} \cdot A_{SL} \cdot P_{NL}}{\sigma_{NL} A_{NL} \cdot P_{SL}}$$

since it is assumed that the electric conductivity $\sigma_{SL}$ of the matrix of the superconducting elements is substantially smaller than the corresponding conductivity $\sigma_{NL}$ of the stabilizing elements, so that we then have:

$$\sigma_{NL} \cdot A_{NL} >> \sigma_{SL} \cdot A_{SL}$$

What is claimed is:

1. In a cable shaped cryogenically stabilized heavy current superconductor structure including several superconducting elements which contain wires of superconductive material embedded in a matrix material of predetermined electric conductivity; stabilizing elements of a thermally and electrically highly conductive material which is normally conducting at the operating temperature of the superconductor structure extending parallel thereto, the electric conductivity of said stabilizing elements being substantially higher in the normally conducting state of the heavy current superconductor than that of the matrix material of the superconducting elements; and a support body of a material of relatively low thermal and electric conductivity, on which said stabilizing elements and said superconducting elements are fastened, the improvement comprising: the stabilizing elements being arranged physically separated at a predetermined spacing from the respective adjacent superconducting elements so that only a poorly heat conducting connection and moderate ohmic coupling is provided between said stabilizing elements and superconducting elements, and the spacings so formed between adjacent superconducting elements and the stabilizing elements being, at least largely, filled with a cryogenic coolant.

2. The improvement according to claim 1, wherein said support body is made of metal and said superconducting element and said stabilizing elements are soldered thereto with a high-resistance solder.

3. The improvement according to claim 1 wherein said support body is a ribbon-shaped support body with a center plane of insulating material.

4. The improvement according to claim 1 wherein the matrix material of the superconducting elements has an electric conductivity which is smaller by at least one order of magnitude than that of the normally conducting material of said stabilizing elements.

5. The improvement according to claim 1 wherein superconducting elements with a matrix of bronze and superconducting wires of Nb$_3$Sn are used.

6. The improvement according to claim 1 wherein superconducting elements with a matrix of a copper-nickel alloy and superconducting conductor wires of a niobium-titanium alloy are used.

7. The improvement according to claim 1 wherein superconducting elements are bundles of carbon fibers coated with niobium carbonitride.

8. The improvement according to one of the claims 1 to 3, wherein said heavy current superconductor structure is a hollow conductor structure with a coolant-tight jacket of non-magnetic material.

* * * * *